United States Patent Office 3,804,831
Patented Apr. 16, 1974

3,804,831
WATER-INSOLUBLE STYRYL DYESTUFFS CONTAINING A PYRIDYL-LOWER ALKYL GROUP
Visvanathan Ramanathan, Klybeckstrasse 18,
Basel, Switzerland
No Drawing. Continuation of application Ser. No.
872,362, Oct. 29, 1969, which is a continuation-in-part of application Ser. No. 621,154, Mar. 7, 1967, both now abandoned. This application Apr. 5, 1972, Ser. No. 241,422
Claims priority, application Switzerland, Mar. 17, 1966, 3,972/66
Int. Cl. C09b 23/14
U.S. Cl. 260—240 R                                     8 Claims

ABSTRACT OF THE DISCLOSURE

The present invention concerns water-insoluble styryl dyestuffs which are characterized by the presence of a pyridylalkyl group, which is attached directly or via an oxyalkyl or an aminoalkyl group to an amino group which is in para-position to the methine group. These new dyestuffs are useful for dyeing polyester, polyacrylonitrile or cellulose acetate fibers from aqueous dispersion. Strong greenish yellow dyeings of excellent fastness properties are obtained.

CROSS REFERENCE TO RELATED APPLICATIONS

This application is a continuation of application Ser. No. 872,362 filed Oct. 29, 1969, now abandoned, which application was a continuation-in-part of application Ser. No. 621,154 filed Mar. 7, 1967, now abandoned.

The present invention is based on the observation that valuable new water-insoluble styryl dyestuffs of the formula

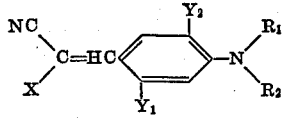

in which $R_1$ is selected from the group of pyridyl-lower-alkyl, pyridyl-lower-alkylamino lower alkyl and pyridyl-lower-alkoxy-lower-alkyl, $R_2$ is selected from the group of lower alkyl or lower alkoxy-lower-alkyl which may be substituted by no other groups than hydroxy, cyano, lower alkoxy, aryl, aryloxy, aralkoxy, acyl, acyloxy, or phenyl sulphonyl, X is selected from the group of cyano, carboxylic acid ester, lower alkyl-, aralkyl- or aryl sulphonyl and carbonamide and $Y_1$ and $Y_2$ each is selected from the group of hydrogen, chlorine, bromine, lower alkyl and lower alkoxy, and wherein lower means containing at most 4 carbon atoms and acyl means that radical of a low molecular carboxylic acid containing at most 13 carbon atoms, may be obtained when (a) an aldehyde of the formula

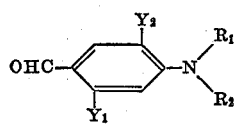

in which $R_1$, $R_2$, $Y_1$ and $Y_2$ have the meanings given above, or an aldimine thereof, is condensed with malonitrile, a cyanoacetic acid ester, lower alkyl-, aralkyl-, or arylsulphonylacetonitrile or with a cyanoacetic acid amide, or (b) a styryl derivative of the formula

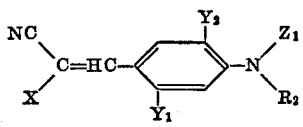

in which $R_2$, X, $Y_1$ and $Y_2$ have the meanings given above and $Z_1$ represents a hydrogen atom or a hydroxyalkyl group, is treated with a vinylpyridine.

Starting materials which are specially suitable for use in method (a) of the process of the invention are aldehydes of the formula

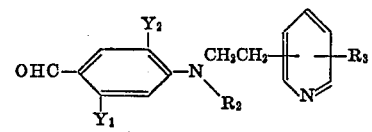

in which $Y_1$ and $Y_2$ have the meanings given above, $R_2$ is selected from the group of lower alkyl, aroyloxy-lower-alkyl, arylaminocarbonyloxy-lower-alkyl, lower alkanoyloxy-lower alkyl and benzyl, and $R_3$ is selected from the group of hydrogen and lower alkyl. These aldehydes may be obtained by condensing the appropriate N-alkyl-para-aminobenzaldehyde, for example, N-methyl-para-aminobenzaldehyde, N-ethyl-para-aminobenzaldehyde, N-butyl-para-aminobenzaldehyde, 2 - methyl-4-methylaminobenzaldehyde or 2-methyl-4-benzylaminobenzaldehyde, with a vinylpyridine, for example, 2-, 3- or 4-vinylpyridine or 2-vinyl-5-methylpyridine.

Condensation between the aldehyde and the malonitrile or the cyanoacetic acid alkyl ester is advantageously carried out with the application of heat in the presence of a basic catalyst, for example, dimethylamine, diethylamine, piperidine, piperidine acetate or sodium or potassium alcoholate, if desired, in the presence of a solvent, for example, methanol, ethanol, benzene, toluene, xylene, chloroform or carbon tetrachloride. When using a solvent, the water formed during the reaction may be removed continuously from the reaction mixture by azeotropic distillation of the slovent, whereby the equilibrium of the reaction is constantly shifted in favor of the condensation product. Condensation may also be carried out in glacial acetic acid or another organic acid acid without the use of a basic catalyst, or in the absence of a solvent by melting the reactants in the presence of a basic catalyst, for example, ammonium acetate or piperidine acetate.

The aldehydes may be replaced as starting materials by their aldimines, that is to say, the products obtained by condensing the aldehydes with primary amines, especially aminobenzenes, in other words, so-called Schiff bases of the formula

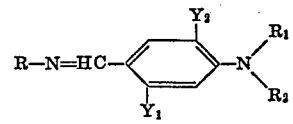

in which R preferably represents a benzene residue, for example, a phenyl or a sulphophenyl residue. Such aldimines may be obtained by condensing the product obtained by reacting formaldehyde and hydrochloric acid with an amine of the formula

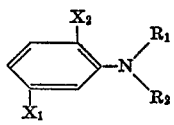

with a nitrobenzene, for example, a nitrobenzene sulphonic acid in the presence of iron and hydorchloric acid in accordance with Example 17 of United States patent specification No. 2,583,551.

In method (b) of the process of the invention it is expedient to use as starting materials compounds of the formula

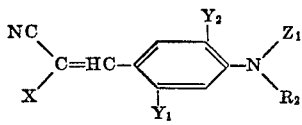

in which $Z_1$, X, $Y_1$ and $Y_2$ have the meanings given above.

Depending on whether Z represents a hydrogen atom or a hydroxyalkyl group, the reaction with the vinylpyridine is preferably carried out in the presence of an acid catalyst, for example, glacial acetic acid or in the presence of a basic catalyst, for example, an alkali metal hydroxide.

After conversion into a finely divided state, the new dyestuffs are eminently suitable for dyeing and printing man-made fibres, for example, fibres made from cellulose diacetate and triacetate, and from polyacrylonitrile, polyamides, polyolefines and aromatic polyesters. They produce yellow tints possessing an excellent fastness to light and sublimation.

The following examples illustrate the invention. Unless otherwise stated, the parts and percentages are by weight.

EXAMPLE 1

12.7 parts of 2-(2-N-methylanilinoethyl)-pyridine are added at 0 to 5° C. to a mixture of 10.5 parts of dimethylformamide and 15.1 parts of phosphorus oxychloride and the batch is heated at about 60° C. for 6 hours. After the reaction, the batch is poured on to a mixture of 200 parts of ice and 200 parts of water while stirring well, and the pH is adjusted to 8 to 9 by the addition of sodium hydroxide solution. After some time, the oily aldehyde which precipitates is extracted with chloroform and the chloroform solution is evaporated.

The aldehyde so obtained is heated to the boil under reflux together with 4.35 parts of malonic acid dinitrile, 0.6 part of piperidine and 60 parts of methyl alcohol. The batch turns a deep yellow. After about 4 hours the mixture is cooled and poured into 500 parts of water. The dyestuff of the formula

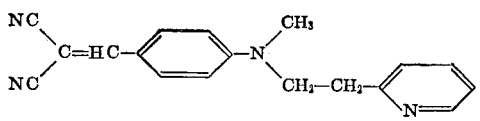

which precipitates is isolated by filtration, washed with water and dried. It dyes polyacrylonitrile and cellulose acetate fibres yellow tints possessing excellent properties of fastness when applied in the form of an aqueous dispersion.

Dyeing prescription 1 part of the dyestuff obtained in the manner described in this example is ground wet with 2 parts of a 50% aqueous solution of the sodium salt of 1,1'-dinaphthylmethane-2,2'-disulphonic acid.

The dyestuff preparation so obtained is mixed with 40 parts of a 10% aqueous solutionof the sodium salt of N-benzyl-μ-heptadecylbenzimidazole disulphonic acid. A dyebath of 4,000 parts is prepared therefrom by dilution with water. The pH value of the bath is adjusted to 4 to 5 with acetic acid.

100 parts of a cleaned polyacrylonitrile fibre material are entered into this dyebath at 80° C., the temperature is raised to 100° C. within 30 minutes and dyeing is carried out for one hour at the boil. After dyeing, the bath is slowly cooled to 60° C. and the fibrous material is then well rinsed and dried. A strong yellow dyeing possessing excellent properties of fastness is obtained.

EXAMPLE 2

13.56 parts of 3 - (2-N-methylanilinoethyl)-6-methylpyridine are added at 0 to 5° C. to a mixture of 10.5 parts of dimethylformamide and 15.1 parts of phosphorus oxychloride and the batch is heated at 60° C. for 6 hours. After the reaction, the batch is poured on to a mixture of 200 parts of ice and 200 parts of water while stirring well, and the pH is adjusted to 8 to 9 by the addition of sodium hydroxide solution. The oily aldehyde which precipitates is extracted with chloroform and the chloroform solution is evaporated.

The aldehyde so obtained is heated to the boil under reflux together wth 4.4 parts of malonic acid dinitrile, 0.6 part of piperidine and 60 parts of methyl alcohol. The batch turns a deep yellow. After 4 hours the mixture is cooled. The dyestuff which precipitates is isolated by filtration, washed with a small amount of methyl alcohol and dried. The dyestuff of the formula

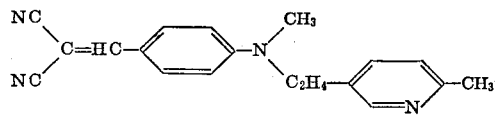

dyes polyacrylonitrile and cellulose acetate fibres yellow tints possessing excellent properties of fastness when applied in the form of an aqueous dispersion.

EXAMPLE 3

75.5 parts of N(2' - hydroxyethyl)-1,3-toluidine, 78.7 parts of 2-vinylpyridine and 30 parts of glacial acetic acid are stirred for 40 hours at a temperature of about 90° C. The mixture is cooled, a solution of 30 parts of sodium hydroxide in 300 parts of alcohol is added and the batch is boiled for 1 hour under reflux. The alcohol is distilled, the residue is diluted with chloroform and washed with water until neutral. The chloroform solution is dried and distilled. The N(2'-hydroxyethyl)-N-2''-2'-pyridylethyl-1, 3-toluidine distils at 155 to 160° C. under a pressure of 0.03 mm. Hg.

12.8 parts of N(2'-hydroxyethyl)-N-2''-2'-pyridylethyl-1,3-toluidine are dissolved in 35 parts of pyridine. 8.45 parts of benzoyl chloride are added dropwise at 20 to 25° C., the mixture is heated to 80° C. within 1 hour and then stirred for 1 hour. The batch is cooled, poured on to a mixture of 200 parts of ice and 200 parts of water, and the pH value is adjusted to 7 by the addition of sodium hydroxide solution. The product is extracted with ether and the ether extract is dried and evaporated.

The benzoyl ester so obtained is added at 0 to 5° C. to a mixture of 8.75 parts of dimethylformamide and 12.6 parts of phosphorus oxychloride and the batch is heated for 6 hours at a temperature of about 60° C. After the reaction, the batch is poured on to a mixture of 200 parts of ice and 200 parts of water and the pH value is adjusted to 7 to 8 by the addition of sodium hydroxide solution. The aldehyde which precipitates is isolated and washed with water and dried.

11.64 parts of the aldehyde so obtained are heated to the boil under reflux together with 2.2 parts of malonic acid dinitrile, 0.3 part of piperidine and 30 parts of methyl alcohol. After 4 hours, the mixture is cooled. The dyestuff which precipitates is isolated by filtration, washed with a small amount of methyl alcohol and dried. The dyestuff of the formula

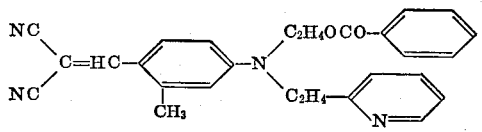

dyes polyester, polyacrylonitrile and cellulose acetate fibres yellow tints possessing excellent properties of fastness when applied in the form of an aqueous dispersion.

Dyeing prescription 1 part of the dyestuff obtained in the manner described in this example is ground wet with 2 parts of a 50% aqueous solution of the sodium salt of 1,1'-dinaphthylmethane-2,2'-disulphonic acid.

The dyestuff preparation so obtained is mixed with 40 parts of a 10% aqueous solution of the sodium salt of N - benzyl-μ-hepta-decylbenzimidazole disulphonic acid, and then 8 parts of ammonium sulphate are added. A dyebath of 4,000 parts is prepared therefrom by dilution with water and the pH of the bath is adjusted to between 5 and 6 by the addition of formic acid.

100 parts of cleaned polyester fibre material are entered into this bath at 50° C., the temperature is raised to 130° C. within 30 minutes and dyeing is carried out for one hour at that temperature in a closed vessel. The material is then well rinsed. A strong yellow dyeing possessing excellent properties of fastness is obtained.

EXAMPLE 4

12.8 parts of N(2' - hydroxyethyl)-N-2'',2'-pyridylethylethyl-1,3-toluidine and 7.2 parts of phenylisocyanate are heated for 1 hour at 90° C.

The urethane so obtained is converted into the aldehyde and then into the dyestuff by the process described in Example 3. The dyestuff of the formula

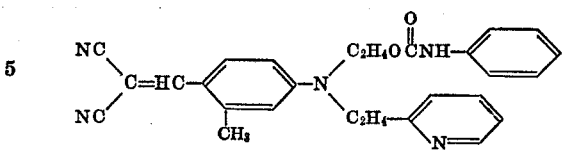

dyes polyester, polyacrylonitrile and cellulose acetate fibres yellow tints possessing very good properties of fastness when applied in the form of an aqueous dispersion.

The following table illustrates a further series of yellow dyestuffs of the formula

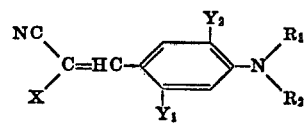

which may be obtained when the corresponding aminobenzaldehyde is condensed with a nitrile of the formula

by the process described in the preceding examples.

| No. | X | $Y_1$ | $Y_2$ | $R_2$ | $R_1$ |
|---|---|---|---|---|---|
| 1 | $COOC_2H_5$ | H | H | $CH_3$ | $C_2H_4$-pyridyl |
| 2 | $SO_2$-phenyl | H | H | $CH_3$ | Same as above. |
| 3 | $CONH_2$ | H | H | $CH_3$ | Do. |
| 4 | CN | H | H | $CH_3$ | $C_2H_4$-pyridyl |
| 5 | $SO_2$-phenyl | H | H | $CH_3$ | Same as above. |
| 6 | $COOC_2H_5$ | H | H | $CH_3$ | Do. |
| 7 | CN | $CH_3$ | H | $C_2H_5$ | $C_2H_4$-(pyridyl)-$CH_3$ |
| 8 | $SO_2$-phenyl | H | H | $CH_3$ | Same as above |
| 9 | $COOC_2H_5$ | H | H | $CH_3$ | Do. |
| 10 | CN | H | H | $C_2H_5$ | $C_2H_4OC_2H_4$-pyridyl |
| 11 | CN | H | H | $CH_3$-phenyl | $C_2H_4$-pyridyl |
| 12 | CN | H | H | $C_2H_4OCH_3$ | Same as above. |
| 13 | CN | H | H | $C_2H_4O$-phenyl | $C_2H_4$-pyridyl |
| 14 | CN | H | H | $C_2H_5$ | $C_2H_4NHC_2H_4$-pyridyl |
| 15 | CN | $OCH_3$ | H | $C_6H_5$ | $C_2H_4$-pyridyl |
| 16 | CN | Cl | H | $C_6H_5$ | Same as above. |
| 17 | CN | H | $OCH_3$ | $C_2H_5$ | Do. |
| 18 | CN | $CH_3$ | H | $C_2H_4OCO$-phenyl-Cl | Do. |
| 19 | CN | $CH_3$ | H | $C_2H_4OCO$-phenyl-$CH_3$ | Do. |

3,804,831

TABLE—Continued

| No. | X | X | Y₁ | R₂ | R₁ |
|---|---|---|---|---|---|
| 20 | CN | CH₃ | H | C₂H₄OCO—C₆H₄—OCH₃ | Same as No. 15. |
| 21 | CN | CH₃ | H | C₂H₄OCO-(thiophene) | Do. |
| 22 | CN | H | H | C₂H₄OCO—C₆H₅ | CH₂-(2-pyridyl) |
| 23 | CN | C₂H₅ | H | CH₂CH(CH₃)CH₃ | C₂H₄-(3-pyridyl) |
| 24 | CN | C₂H₅ | H | C₂H₄—C₆H₅ | C₂H₄-(2-methylpyridyl) |
| 25 | CN | C₂H₅ | H | C₂H₄OH | C₂H₄-(pyridyl) |
| 26 | CN | C₂H₅ | H | CH(OH)CH₂—C₆H₅ | C₂H₄-(pyridyl) |
| 27 | CN | CH(CH₃)₂ | H | C₂H₄OC₂H₅ | C₂H₄-(2-methylpyridyl) |
| 28 | CN | CH(CH₃)₂ | H | C₂H₄OCH₂—C₆H₅ | Same as above. |
| 29 | CN | CH(CH₃)₂ | H | C₂H₄OC₂H₄CN | C₂H₄-(pyridyl) |
| 30 | CN | CH(CH₃)₂ | H | C₂H₃OC₂H₄COOC₂H₅ | Same as above. |
| 31 | CN | C₄H₉ | H | CH₂CH₂CHCH₃ / OC₃H₇ | C₂H₄-(pyridyl) |
| 32 | CN | C₄H₉ | H | CH₂CH₂—CH—CH(CH₃)₂ / OC₄H₉ | Same as above. |
| 33 | CN | Br | H | CH₂CH—CH₂OCH₃ / OCH₃ | Do. |
| 34 | CN | Br | H | CH₃CH₂O—C₆H₄—OCH₃ | C₂H₄-(pyridyl) |
| 35 | CN | OC₂H₅ | H | CH₃CH₂OCOCH₃ | Same as above. |
| 36 | CN | OC₂H₅ | H | CH₃CH₂OCOC₃H₇ | Do. |
| 37 | CN | OCH(CH₃)₂ | H | C₂H₄OCO—C₆H₁₀—H | Do. |
| 38 | CN | OCH₃ | H | C₂H₄OCO—C₆H₁₀—H / COOCH₃ | C₂H₄-(2-pyridyl) |
| 39 | CN | OC₄H₉ | H | C₂H₄OCOC₂H₄COOC₂H₅ | C₂H₄-(pyridyl) |
| 40 | CN | OC₄H₉ | H | C₂H₄OC₂H₄OCO—C₆H₅ | Same as above. |
| 41 | CN | CH₃ | OC₂H₅ | CH₂CHCH₃ / OCOCH₂—C₆H₅ | Do. |
| 42 | CN | CH₃ | H | CH₃CH₂OCO—C₆H₄—Br | Do. |
| 43 | CN | CH₃ | H | CH₃CH₂OCO—C₆H₄—C(CH₃)₃ | Do. |
| 44 | CN | CH₃ | H | C₂H₄OCO—C₆H₄—COOCH₃ | Do. |

TABLE—Continued

| No. | X | Y₁ | Y₂ | R₂ | R₁ |
|---|---|---|---|---|---|
| 45 | CN | CH₃ | H | C₂H₄OCO—⌬—CN | Same as No. 39. |
| 46 | CN | CH₃ | H | C₂H₄OCO—⌬—COOC₂H₅ | Do. |
| 47 | CN | CH₃ | H | C₂H₄OCO—(thiophene)—COOCH₃ | Do. |
| 48 | CH | CH₃ | H | C₂H₄OCO—(furan) | Do. |
| 49 | CH | CH₃ | H | C₂H₄OCOCH₂—(pyridine) | Do. |
| 50 | CN | CH₃ | H | C₂H₄OCO—⌬—⌬ | Do. |
| 51 | CN | CH₃ | H | C₂H₄OCO—(furan)—⌬—Cl | Do. |
| 52 | CN | CH₃ | H | C₂H₄OCOCH₂CN | C₂H₄—(pyridine) |
| 53 | CN | CH₃ | H | C₂H₄OCOCH₂OCH₃ | Same as above. |
| 54 | CN | CH₃ | H | C₂H₄OCOCH₂O—⌬ | Do. |
| 55 | CN | CH₃ | H | C₂H₄OCOCH₂O—⌬(CH₃)—Cl | Do. |
| 56 | CN | CH₃ | H | C₂H₄OCO(CH₂)₂O—⌬(CH₃)—Cl | Do. |
| 57 | CN | CH₃ | H | C₂H₄OCOC(CH₃)₃ | Do. |
| 58 | CN | CH₃ | H | C₂H₄OCOCH₂SO₂—⌬ | C₂H₄—(pyridine) |
| 59 | CN | CH₃ | H | C₂H₄OCOC₂H₄COCH₃ | Same as above. |
| 60 | CN | CH₃ | H | CH₂—CHCH₂OCO—⌬ / OCO—⌬ | Do. |
| 61 | CN | H | OC₃H₇ | CH₂CH—⌬ / OCOCH₃ | Do. |
| 62 | CN | H | OC₃H₇ | C₂H₄OCOCH=CH—⌬ | Do. |
| 63 | CN | H | OC₄H₉ | CH₂CH₂OCOOC₂H₅ | —C₄H₈—(pyridine) |
| 64 | CN | H | OC₄H₉ | C₂H₄OCOO—⌬ | C₂H₄—(pyridine) |
| 65 | CN | CH₃ | H | C₂H₄OCONH—⌬(CH₃)(CH₃) | Same as above. |
| 66 | CN | CH₃ | H | C₂H₄OCONH—⌬—Cl | Do. |
| 67 | CN | CH₃ | H | C₂H₄OCONH—⌬—COOCH₃ | Do. |
| 68 | CN | H | OC₃H₇ | C₂H₄OCONHC₄H₉ | Do. |
| 69 | CN | H | OC₄H₉ | C₂H₄CN | Do. |

TABLE—Continued

| No. | X | Y₁ | Y₂ | R₂ | R₁ |
|---|---|---|---|---|---|
| 70 | CN | CH₃ | H | C₂H₄CO—C₆H₅ | Same as No. 64. |
| 71 | CN | CH₃ | H | C₂H₄SO—C₆H₅ | Do. |
| 72 | CN | H | H | C₂H₅ | CH₃CHCH₂OC₂H₄—(2-pyridyl)<br>\|<br>CH₃ |
| 73 | CN | H | CH₃ | C₂H₅ | CH₃CHCH₂NHC₂H₄—(2-pyridyl)<br>\|<br>CH₃ |
| 74 | CN | H | C₂H₅ | C₂H₅ | CH₃CH₂NC₂H₄—(2-pyridyl)<br>\|<br>CH₃ |
| 75 | CN | Cl | H | C₂H₅ | C₂H₄NC₂H₄—(2-pyridyl)<br>\|<br>C₂H₄—C₆H₅ |
| 76 | CN | Cl | H | C₂H₅ | C₂H₄NC₂H₄—(2-pyridyl)<br>\|<br>C₆H₄—CH₃ |
| 77 | CN | OCH₃ | OCH₃ | C₂H₄COOC₂H₅ | C₂H₄—(2-pyridyl) |
| 78 | COOCH₃ | CH₃ | H | CH₂—CH(CH₃)₂ | C₂H₄—(2-pyridyl) |
| 79 | COOCH₃ | CH₃ | H | CH₂—C₆H₅ | C₂H₄—(2-pyridyl) |
| 80 | COOC₃H₇ | C₂H₅ | H | C₂H₄—C₆H₅ | Same as above. |
| 81 | COOC₃H₇ | C₂H₅ | H | C₂H₄OH | Do. |
| 82 | COOC₂H₄OC₂H₅ | CH(CH₃)₂ | H | CH₂CH(OH)—C₆H₅ | Do. |
| 83 | COOC₂H₄CN | CH(CH₃)₂ | H | C₂H₄OC₃H₇ | C₂H₄—(2-methyl-pyridyl) |
| 84 | COOC₂H₄CN | C₄H₉ | H | C₂H₄OCH₂—C₆H₅ | C₂H₄—(2,6-dimethyl-pyridyl) |
| 85 | COOC₂H₄OCH₃ | C₄H₉ | H | C₂H₄OC₂H₄CN | C₂H₄—(pyridyl) |
| 86 | COOCH₂—C₆H₅ | Cl | H | C₂H₄OC₂H₄COOCH₃ | Same as above. |
| 87 | Same as above | OCH₃ | H | C₂H₄CHOC₂H₅<br>\|<br>CH₃ | C₂H₄—(pyridyl-CH₃) |
| 88 | COOCH(CH₃)₂ | Br | H | CH₃CHCH₂CH(CH₃)₂<br>\|<br>OC₄H₉ | Same as above. |
| 89 | COOCH(CH₃)₂ | Cl | H | C₂H₄O—C₆H₅ | Do. |
| 90 | COOCH(CH₃)₂ | Cl | H | C₂H₄—C₆H₄—OCH₃ | Do. |

TABLE—Continued

| No. | X | Y₁ | Y₂ | R₂ | R₁ |
|---|---|---|---|---|---|
| 91 | COO—C₆H₅ | CH₃ | H | C₂H₄OCOC₂H₅ | C₂H₄—(2-pyridyl) |
| 92 | Same as above | OCH₃ | H | C₂H₄OCOC₄H₉ | Same as above |
| 93 | COO—C₆H₄—CH₃ | OCH₃ | H | C₂H₄OCO—C₆H₅ | C₂H₄—(2-pyridyl) |
| 94 | Same as above | OCH₃ | H | C₂H₄OCOCH=CHCOOCH₃ | C₂H₄—(2-pyridyl) |
| 95 | COO—C₆H₄—Cl | OC₂H₅ | H | C₂H₄OC₂H₄OCO—C₆H₄—CH₃ | Same as above |
| 96 | Same as above | OC₂H₅ | H | C₄H₈OOCH=CH—C₆H₄—OCH₃ | Do. |
| 97 | do | OCH(CH₃)₂ | H | CH₂CH(CH₃)OCOCH₂—C₆H₅ | C₂H₄—(4-pyridyl) |
| 98 | COOC₂H₄—C₆H₅ | OC₄H₉ | H | C₂H₄OCO—C₆H₄—OCH₃ | C₂H₄—(2-pyridyl) |
| 99 | Same as above | OC₄H₉ | H | C₂H₄OCO—C₆H₄—Cl | Same as above |
| 100 | COOC₂H₄O—C₆H₅ | H | OCH₃ | C₂H₄OCO—C₆H₄—Br | Do. |
| 101 | COOC₃H₆OCH(CH₃)₂ | H | OCH₃ | C₂H₄OCO—C₆H₄—C(CH₃)₃ | Do. |
| 102 | COOC₂H₅ | CH₃ | H | C₂H₄OCO—C₆H₄—COOCH₃ | Do. |
| 103 | COS—C₆H₅ | H | OC₂H₅ | C₂H₄OCO—C₆H₄—CN | C₂H₄—(4-pyridyl) |
| 104 | COS—C₆H₃Cl₂ | H | OC₂H₅ | C₂H₅OCO—(thienyl)—COOC₂H₅ | Same as above |
| 105 | COOC₂H₄O—C₆H₅ | H | OC₃H₇ | C₂H₅OCO—(thienyl) | Do. |
| 106 | COOC₂H₄—(2-pyridyl) | H | H | C₂H₄OCO—C₆H₅ | CH₂—(2-pyridyl) |
| 107 | COO—C₆H₅ | H | OC₄H₉ | C₂H₄OCO—(thienyl) | CH₂—(4-pyridyl) |
| 108 | COOCH₂—(thienyl) | H | OC₄H₉ | C₂H₄OCO—(pyridyl) | C₂H₄—(2-pyridyl) |
| 109 | COOCH₂—(furyl) | CH₃ | H | C₂H₄OCO—C₆H₄—C₆H₅ | Same as above |
| 110 | COOCH₂—(pyridyl) | CH₃ | H | C₂H₄OCOC₂H₄CN | Do. |
| 111 | COOCH₂—(furyl) | CH₃ | H | C₂H₄OCOC₂H₄OCH₃ | Do. |

TABLE—Continued

| No. | X | Y₁ | Y₂ | R₂ | R₁ |
|---|---|---|---|---|---|
| 112 | COO—C₆H₄—OCH₃ | CH₃ | H | C₂H₄OCOCH₂O—C₆H₅ | Same as No. 108. |
| 113 | COOCH₂—CH(CH₂)₄O (epoxide) | CH₃ | H | C₂H₄OCOC₆H₃(CH₃)O—C₆H₄—Cl | Do. |
| 114 | COOCH(CH₂CH₃)(CH₂CH₃) | CH₃ | H | C₂H₄OCOC(CH₃)₃ | Do. |
| 115 | COOC₂H₄OH | CH₃ | H | C₂H₄OCOCH₂SO₂—C₆H₅ | Do. |
| 116 | COOCH₂N(CO)₂C₆H₄ (phthalimide) | CH₃ | H | C₂H₄OCOC₆H₄COCH₃ | Do. |
| 117 | COOC₄H₉ | CH₃ | H | CH₃—CH₂CH₂OCO—C₆H₅ / OCO—C₆H₅ | Do. |
| 118 | COOCH₂CH(CH₃)CH₃ | CH₃ | OCH₃ | CH₂—CH(OCOCH₃)—C₆H₅ | C₂H₄—(4-pyridyl) |
| 119 | COOCH₂COCH₃ | CH₃ | OCH₃ | C₂H₄OCOOC₂H₅ | C₂H₄—(4-pyridyl) |
| 120 | COOC₂H₅ | CH₃ | H | C₂H₄OCOOCH₂—C₆H₅ | Same as above. |
| 121 | COOC₂H₅ | CH₃ | H | C₂H₄OCOO—C₆H₅ | C₂H₄—(2-pyridyl) |
| 122 | COOC₂H₅ | CH₃ | H | C₂H₄OCONH—C₆H₅ | Same as above. |
| 123 | COOC₂H₅ | CH₃ | H | C₂H₄OCONH—C₆H₄—CH₃ | Do. |
| 124 | COOC₂H₄OCH₃ | OCH₃ | H | C₂H₄OCONH—C₆H₄—NO₂ | Do. |
| 125 | COOC₂H₄OCH₃ | OCH₃ | H | C₂H₄OCONH—C₆H₄—OCH₃ | Do. |
| 126 | COOC₂H₄OCH₃ | C₂H₅ | H | C₂H₄OCONHC₄H₉ | Do. |
| 127 | COOCH₃ | C₂H₅ | H | C₂H₄CN | Do. |
| 128 | COOCH₃ | CH₃ | H | C₂H₄CO—C₆H₅ | Do. |
| 129 | COOCH₃ | CH₃ | H | C₂H₄SO₂—C₆H₅ | Do. |
| 130 | COOC₂H₅ | H | H | C₂H₅ | C₂H₄OC₂H₄—(2-pyridyl) |
| 131 | COOC₂H₅ | H | CH₃ | C₂H₅ | CH₂CH(CH₃)CH₂OC₂H₄—(2-pyridyl) |
| 132 | COOC₂H₅ | H | C₂H₅ | C₂H₅ | CH₂CH(CH₃)CH₂NHC₂H₄—(2-pyridyl) |
| 133 | COOC₂H₅ | OCH₃ | H | C₂H₅ | CH₃CH₂N(CH₃)C₂H₄—(2-pyridyl) |
| 134 | COOC₂H₅ | OCH₃ | H | C₂H₅ | C₂H₄N(C₂H₄—C₆H₅)C₂H₄—(2-pyridyl) |

3,804,831

TABLE—Continued

| No. | X | Y₁ | Y₂ | R₂ | R₁ |
|---|---|---|---|---|---|
| 135 | COOC₂H₅ | OCH₃ | H | C₂H₅ | C₂H₄NHC₂H₄-(2-pyridyl) |
| 136 | COOC₂H₅ | OCH₃ | H | C₂H₅ | C₂H₄NC₂H₄-(2-pyridyl), attached to p-methoxyphenyl |
| 137 | CONH₂ | CH₃ | H | C₄H₉ | C₂H₄-(3-pyridyl) |
| 138 | CONHC₄H₉ | CH₃ | H | CH₂CH(CH₃)₂ | Same as above. |
| 139 | CONHC₄H₉ | C₂H₅ | H | CH₂-C₆H₅ | C₂H₄-(2-pyridyl) |
| 140 | CONHCH(CH₃)₂ | C₂H₅ | H | C₂H₄-C₆H₅ | Same as above. |
| 141 | CONHCH(CH₃)₂ | CH(CH₃)₂ | H | C₂H₄OH | Do. |
| 142 | CONHC₂H₄OC₂H₅ | CH(CH₃)₂ | H | CH₂CH(OH)-C₆H₅ | Do. |
| 143 | CONHC₂H₄O-C₆H₅ | C₄H₉ | H | C₂H₄OCH₃ | C₂H₄-(2-methyl-pyridyl) |
| 144 | CONHC₂H₄OCH(CH₃)₂ | C₄H₉ | H | C₂H₄OCH₂-C₆H₅ | C₂H₄-(6-methyl-pyridyl) |
| 145 | CONHC₂H₄OCH(CH₃)₂ | Cl | H | C₂H₄OC₂H₄CN | C₂H₄-(4-pyridyl) |
| 146 | CONHCH₂-C₆H₅ | OCH₃ | H | C₂H₄OC₂H₄COOC₂H₅ | Same as above. |
| 147 | Same as above | Br | H | C₂H₄CH(OCH₃)CH₃ | C₂H₄-(6-methyl-pyridyl) |
| 148 | CONHC₂H₄CN | Cl | H | CH₂CH(OC₄H₉)CH₂CH(CH₃)₂ | Same as above. |
| 149 | CONHC₂H₄CN | Cl | H | C₂H₄O-C₆H₅ | Do. |
| 150 | CONHC₂H₄-C₆H₅ | H | H | C₂H₄-C₆H₄-C₂H₅ | Do. |
| 151 | Same as above | OCH₃ | H | C₂H₄OCOCH₃ | C₂H₄-(2-pyridyl) |
| 152 | CONHC₂H₄OH | OCH₃ | H | C₂H₅OCOC₄H₉ | Same as above. |
| 153 | CONHC₂H₄OH | OCH₃ | H | C₂H₄OCO-C₆H₁₁ | C₂H₄-(2-pyridyl) |
| 154 | CONHC₂H₄-(pyridyl) | OC₂H₅ | H | C₂H₄OCOCH₂CH₂COOCH₃ | C₂H₄-(2-pyridyl) |
| 155 | Same as above | OC₂H₅ | H | C₂H₄OC₂H₄COO-(3-Cl-C₆H₄) | Same as above. |
| 156 | CONHC₂H₄SO₂-C₆H₅ | OC₃H₇ | H | C₄H₈OCOCH=CH-C₆H₅ | Do. |
| 157 | Same as above | OCH(CH₃)₂ | H | CH₂CH(OCOCH₂-C₆H₅)CH₃ | C₂H₄-(4-pyridyl) |

3,804,831

TABLE—Continued

| No. | X | Y₁ | Y₂ | R₂ | R₁ |
|---|---|---|---|---|---|
| 158 | CONH—C₆H₅ | OC₄H₉ | H | C₂H₄OCO—C₆H₅ | C₂H₄—(2-pyridyl) |
| 159 | Same as above | OC₄H₉ | H | C₂H₄OCO—C₆H₄—Cl | Same as above. |
| 160 | do | H | OCH₃ | C₂H₄OCO—C₆H₄—Br | Do. |
| 161 | CONH—C₆H₄—CH₃ | H | OCH₃ | C₂H₄OCO—C₆H₄—C(CH₃)₃ | Do. |
| 162 | CONH—C₆H₃(OC₂H₅) | CH₃ | H | C₂H₄OCO—C₆H₄—COOC₃H₇ | Do. |
| 163 | CONH—C₆H₄—Cl | H | OC₂H₅ | C₂H₄OCO—C₆H₄—CN | C₂H₄—(4-pyridyl) |
| 164 | CONH—C₆H₄—Br | H | OC₂H₅ | C₂H₄OCO—(thienyl)—COOCH₃ | Same as above. |
| 165 | CONH—C₆H₄—NO₂ | H | OC₃H₇ | C₄H₈OCO—(thienyl) | Do. |
| 166 | CONH—C₆H₄—CN | H | OC₅H | C₂H₄OCO—C₆H₄—OCH₃ | CH₂—(2-pyridyl) |
| 167 | Same as above | H | OC₄H₉ | C₂H₄OCO—(furyl) | CH₂—(4-pyridyl) |
| 168 | CONH—(2-pyridyl) | H | OC₄H₉ | C₂H₄OCO—(pyridyl) | C₂H₄—(2-pyridyl) |
| 169 | Same as above | C₂H₅ | H | C₂H₄OCO—C₆H₄—C₆H₅ | Same as above. |
| 170 | CON(piperidyl) | C₂H₅ | H | C₂H₄OCOC₂H₄CN | Do. |
| 171 | Same as above | CH₃ | H | C₂H₄OCOC₂H₄OC₂H₅ | Do. |
| 172 | CON(morpholinyl) | CH₃ | OC₂H₅ | C₂H₄OCOCH₂O—C₆H₅ | Do. |
| 173 | Same as above | CH₃ | OC₂H₅ | C₂H₄OCOCH₂O—C₆H₃(CH₃)(Cl) | Do. |
| 174 | CON(CH₃)₂ | C₄H₉ | OCH₃ | C₂H₄OCOC(CH₃)₃ | Do. |
| 175 | Same as above | C₄H₉ | OCH₃ | C₂H₄OCOCH₂SO₂—C₆H₅ | Do. |
| 176 | CONH—C₆H₁₁ | Cl | OCH₃ | C₂H₄OCOC₂H₄COCH₃ | Do. |
| 177 | Same as above | Cl | OCH₃ | CH₂CHCH₂OCO—C₆H₅ / OCO—C₆H₅ | Do. |
| 178 | CONH—C₆H₅ | CH₃ | OCH₃ | CH₂—CH—C₆H₅ / OCOCH₃ | C₄H₈—(4-pyridyl) |
| 179 | CON—(biphenyl) | CH₃ | OCH₃ | C₂H₄OCOOC₂H₅ | C₂H₄—(4-pyridyl) |

TABLE—Continued

| No. | X | Y₁ | Y₂ | R₂ | R₁ |
|---|---|---|---|---|---|
| 180 | Same as No. 179 | CH₃ | H | C₂H₄OCOOCH₂—⟨C₆H₅⟩ | Same as No. 179. |
| 181 | CON(C₂H₅)—⟨C₆H₅⟩ | CH₃ | H | C₂H₄OCOO—⟨C₆H₅⟩ | C₂H₄—⟨pyridine⟩ |
| 182 | Same as above | CH₃ | H | C₂H₄OCONH—⟨C₆H₅⟩ | Same as above. |
| 183 | CONHC₂H₄CO—⟨C₆H₅⟩ | OCH₃ | OCH₃ | C₂H₄OCONH—⟨C₆H₄⟩—CH₃ | Do. |
| 184 | Same as above | CH₃ | H | C₂H₄OCONH—⟨C₆H₄Cl⟩ | Do. |
| 185 | CONH—⟨C₆H₄Cl⟩ | CH₃ | H | C₂H₄OCONH—⟨C₆H₄⟩—OCH₃ | Do. |
| 186 | Same as above | C₂H₅ | OC₂H₅ | C₂H₄OCONHC₄H₉ | Do. |
| 187 | CONH—⟨C₆H₄⟩—SO₂CH₃ | C₂H₅ | OC₂H₅ | C₂H₄CN | Do. |
| 188 | CON(C₂H₄OCH₃)—⟨C₆H₅⟩ | CH₃ | H | C₂H₄CO—⟨C₆H₅⟩ | Do. |
| 189 | CONH—⟨C₆H₄⟩—CF₃ | CH₃ | H | C₂H₄SO₂—⟨C₆H₅⟩ | Do. |
| 190 | CONH—⟨C₆H₅⟩ | H | H | C₂H₅ | C₂H₄OC₂H₄—⟨pyridine⟩ |
| 191 | Same as above | H | CH₃ | C₂H₅ | CH₂CH(CH₃)CH₂OC₂H₄—⟨pyridine⟩ |
| 192 | do | H | C₂H₅ | C₂H₅ | CH₂CH(CH₃)CH₂NHC₂H₄—⟨pyridine⟩ |
| 193 | CONH—⟨C₆H₄⟩—CH₃ | CH₃ | H | C₂H₅ | C₂H₄N(CH₃)C₂H₄—⟨pyridine⟩ |
| 194 | Same as above | CH₃ | H | C₄H₉ | C₂H₄N(C₂H₄—⟨C₆H₅⟩)C₂H₄—⟨pyridine⟩ |
| 195 | do | OCH₃ | H | C₄H₉ | C₆H₅NHC₂H₄—⟨pyridine⟩ |
| 196 | do | OCH₃ | H | C₄H₉ | C₂H₄N(C₆H₄—CH₃)C₂H₄—⟨pyridine⟩ |
| 197 | SO₂—⟨C₆H₅⟩ | CH₃ | H | C₄H₉ | C₂H₄—⟨pyridine⟩ |
| 198 | SO₂—⟨C₆H₄⟩—CH₃ | CH₃ | H | CH₂CH(CH₃)₂ | Same as above. |
| 199 | Same as above | CH₃ | H | CH₂—⟨C₆H₅⟩ | C₂H₄—⟨pyridine⟩ |
| 200 | do | C₂H₅ | H | C₂H₄—⟨C₆H₅⟩ | Same as above. |

TABLE—Continued

| No. | X | Y$_1$ | Y$_2$ | R$_2$ | R$_1$ |
|---|---|---|---|---|---|
| 201 | SO$_2$-C$_6$H$_4$-CH$_3$ | | H | C$_2$H$_4$OH | Same as No. 199. |
| 202 | Same as above | CH(CH$_3$)$_2$ | H | CH$_2$CH(OH)-C$_6$H$_5$ | Do. |
| 203 | SO$_2$-C$_6$H$_4$-CH$_3$ | CH(CH$_3$)$_2$ | H | C$_2$H$_4$OC$_2$H$_5$ | C$_2$H$_4$-pyridyl-CH$_3$ |
| 204 | Same as above | C$_4$H$_9$ | H | C$_2$H$_4$OCH$_2$-C$_6$H$_5$ | C$_2$H$_4$-pyridyl-CH$_3$ |
| 205 | do | C$_4$H$_9$ | H | C$_2$H$_4$OC$_2$H$_4$CN | C$_2$H$_4$-pyridyl |
| 206 | SO$_2$-C$_6$H$_4$-OCH$_3$ | Cl | H | C$_2$H$_4$OC$_2$H$_4$COOC$_2$H$_5$ | Same as above. |
| 207 | Same as above | OCH$_3$ | H | C$_2$H$_4$CH(CH$_3$)-OCH$_3$ | C$_2$H$_4$-pyridyl-CH$_3$ |
| 208 | do | Br | H | CH$_2$CH(CH$_2$CH(CH$_3$)$_2$)-OC$_4$H$_9$ | Same as above. |
| 209 | SO$_2$-C$_6$H$_4$-OC$_2$H$_5$ | Cl | H | C$_2$H$_4$O-C$_6$H$_5$ | Do. |
| 210 | Same as above | Cl | H | C$_2$H$_4$O-C$_6$H$_4$-CH$_3$ | Do. |
| 211 | do | CH$_3$ | H | C$_2$H$_4$OCOCH$_3$ | C$_2$H$_4$-pyridyl |
| 212 | SO$_2$-C$_6$H$_4$-OCH$_3$ (ortho) | OCH$_3$ | H | C$_3$H$_6$OCOC$_4$H$_9$ | Same as above. |
| 213 | Same as above | OCH$_3$ | H | C$_2$H$_4$OCO-C$_6$H$_{11}$ | C$_2$H$_4$-pyridyl |
| 214 | SO$_2$-C$_6$H$_4$-OC$_2$H$_5$ (ortho) | OCH$_3$ | H | C$_2$H$_4$OCOCH$_2$CH$_2$COOCH$_3$ | C$_2$H$_4$-pyridyl |
| 215 | Same as above | OC$_2$H$_5$ | H | C$_2$H$_4$OC$_2$H$_4$OCO-C$_6$H$_4$-CH$_3$ | Same as above. |
| 216 | SO$_2$-C$_6$H$_4$-OC$_2$H$_5$ | OC$_2$H$_5$ | H | C$_4$H$_9$OCOCH=CH-C$_6$H$_4$-Cl | Do. |
| 217 | Same as above | OCH(CH$_3$)$_2$ | H | CH$_2$CH(CH$_3$)OCOCH$_2$-C$_6$H$_5$ | C$_2$H$_4$-pyridyl |
| 218 | do | OC$_4$H$_9$ | H | C$_2$H$_4$OCO-C$_6$H$_5$ | Same as above. |
| 219 | SO$_2$-C$_6$H$_3$(OCH$_3$)(CH$_3$) | OCH$_3$ | H | C$_2$H$_4$OCO-C$_6$H$_4$-Cl | Do. |
| 220 | Same as above | H | OCH$_3$ | C$_2$H$_4$OCO-C$_6$H$_4$-Br | Do. |
| 221 | do | H | OCH$_3$ | C$_2$H$_4$OCO-C$_6$H$_4$-C(CH$_3$)$_3$ | Do. |
| 222 | SO$_2$-C$_6$H$_5$ | CH$_3$ | H | C$_2$H$_4$OCO-C$_6$H$_4$-COOC$_2$H$_5$ | Do. |

TABLE—Continued

| No. | X | $Y_1$ | $Y_2$ | $R_2$ | $R_1$ |
|---|---|---|---|---|---|
| 223 | $SO_2$-(2,6-di-$CH_3$-4-$OCH_3$-phenyl) | H | $OC_2H_5$ | $C_2H_4OCO$-phenyl-$CN$ | $C_2H_4$-(4-pyridyl) |
| 224 | Same as above | H | $OC_2H_5$ | $C_3H_6OCO$-(thienyl) | Same as above. |
| 225 | $SO_2$-phenyl-$Cl$ | H | $OC_3H_7$ | $C_2H_4OCO$-(thienyl)-$COOCH_3$ | Do. |
| 226 | Same as above | H | $OC_3H_7$ | $C_2H_4OCO$-phenyl | $CH_2$-(2-pyridyl) |
| 227 | ...do... | H | $OC_4H_9$ | $C_4H_8OCO$-(furyl) | $CH_2$-(4-pyridyl) |
| 228 | $SO_2$-phenyl-$Br$ | H | $OC_4H_9$ | $C_2H_4OCO$-(pyridyl) | $C_2H_4$-(2-pyridyl) |
| 229 | Same as above | $CH_3$ | H | $C_2H_4OCO$-biphenyl | Same as above. |
| 230 | ...do... | $CH_3$ | H | $C_2H_4OCOC_2H_4CN$ | Do. |
| 231 | $SO_2$-phenyl-$I$ | $CH_3$ | H | $C_2H_4OCOCH_2OCH_3$ | Do. |
| 232 | $SO_2$-phenyl-$COOCH_3$ | $CH_3$ | $OC_2H_5$ | $C_2H_4OCOCH_2O$-phenyl | Do. |
| 233 | Same as above | $CH_3$ | $OC_2H_5$ | $C_2H_4OCOC_2H_4O$-(2-$CH_3$-4-$Cl$-phenyl) | Do. |
| 234 | $SO_2$-phenyl-$COOCH_3$ | $C_4H_9$ | $OCH_3$ | $C_2H_4OCOC(CH_3)_3$ | Do. |
| 235 | Same as above | $C_4H_9$ | $OCH_3$ | $C_2H_4OCOC_2H_4COCH_3$ | Do. |
| 236 | ...do... | $CH_3$ | H | $CH_2CHCH_2OCO$-phenyl-$OCH_3$; $OCO$-phenyl-$OCH_3$ | Do. |
| 237 | $SO_2$-phenyl-$CN$ | $CH_3$ | $OCH_3$ | $CH_2CH$-phenyl; $OCOC_2H_5$ | $C_4H_8$-(4-pyridyl) |
| 238 | $SO_2$-(4-$CH_3$-2-$CN$-phenyl) | $CH_3$ | $OCH_3$ | $C_2H_4OCOOC_3H_7$ | $C_2H_4$-(4-pyridyl) |
| 239 | $SO_2CH_2$-phenyl | $CH_3$ | H | $C_2H_4OCOOCH_2$-phenyl | Same as above. |
| 240 | Same as above | $CH_3$ | H | $C_2H_4OCOO$-phenyl | $C_2H_4$-(2-pyridyl) |
| 241 | $SO_2$-phenyl | $CH_3$ | H | $C_2H_4OCONH$-phenyl | Same as above. |
| 242 | Same as above | $CH_3$ | H | $C_2H_4OCONH$-(2-$CH_3$-phenyl) | [Do. |

TABLE—Continued

| No. | X | $Y_1$ | $Y_2$ | $R_2$ | $R_1$ |
|---|---|---|---|---|---|
| 243 | $SO_2$-C$_6$H$_4$-NO$_2$ | $OCH_3$ | $OCH_3$ | $C_2H_4OCONH$-C$_6$H$_4$-$OCH_3$ | Same as No. 240. |
| 244 | $SO_2$-C$_6$H$_3$(CH$_3$)(NO$_2$) | Cl | $OCH_3$ | $C_2H_4OCONHC_4H_9$ | Do. |
| 245 | $SO_2$-C$_6$H$_3$(CH$_3$)(CH$_3$) | Cl | $OCH_3$ | $C_2H_4OCONH$-C$_6$H$_{11}$ | Do. |
| 246 | $SO_2$-C$_6$H$_2$(CH$_3$)$_3$ | $C_2H_5$ | $OCH_3$ | $C_2H_4CN$ | Do. |
| 247 | $SO_2$-C$_6$H$_3$(CH$_3$)(CH(CH$_3$)$_2$) | $CH_3$ | $OCH_3$ | $C_2H_4CO$-C$_6$H$_5$ | Do. |
| 248 | $SO_2CH_3$ | H | H | $C_2H_5$ | $C_2H_4OC_2H_4$-Py |
| 249 | $SO_2CH_3$ | H | $CH_3$ | $C_2H_5$ | $CH_2CH(CH_3)CH_2OC_2H_4$-Py |
| 250 | $SO_2C_2H_5$ | H | $C_2H_5$ | $C_2H_5$ | $CH_2CH(CH_3)CH_2NHC_2H_4$-Py |
| 251 | $SO_2C_2H_5$ | $OCH_3$ | H | $C_4H_9$ | $C_2H_4N(CH_3)C_2H_4$-Py |
| 252 | $SO_2C_3H_7$ | $OCH_3$ | H | $C_4H_9$ | $C_2H_4N(C_2H_4$-C$_6$H$_5$)$-C_2H_4$-Py |
| 253 | $SO_2CH(CH_3)_2$ | H | H | $C_4H_9$ | $C_2H_5NHC_2H_4$-Py |
| 254 | Same as above | H | H | $C_4H_9$ | $C_2H_4N(C_6H_4OCH_3)C_2H_4$-Py |
| 255 | $SO_2$-naphthyl | $CH_3$ | H | $CH_2CH(OCOCH_3)CH_2OCOCH_3$ | $C_2H_4$-Py |
| 256 | $SO_2$-naphthyl | $CH_3$ | H | $C_2H_5$ | $C_2H_4OC_2H_4$-Py |

I claim:
1. A water-insoluble styryl dyestuff of the formula

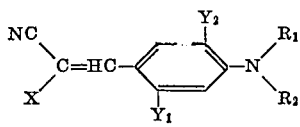

in which $R_1$ is selected from the group of pyridyl-lower-alkyl, pyridyl-lower-alkylamino lower alkyl and pyridyl-lower-alkoxy-lower alkyl, and where the pyridyl radical is substituted by hydrogen or lower alkyl, $R_2$ is lower alkyl or lower alkoxy-lower-alkyl which may be substituted by no other groups than hydroxy, cyano, lower alkoxy, phenyl, toluyl phenoxy, toluyloxy, anisyloxy, benzyloxy, acyl, acyloxy, or phenyl sulfonyl, X is selected from the group of cyano, carboxylic acid ester where the ester moiety is phenyl, benzyl, toluyl, cyclohexyl, lower alkyl and lower alkyl substituted by lower alkoxy, cyano, benzyl, cyclohexyloxy or pyridyl, lower alkyl sulphonyl, phenyl lower alkyl sulphonyl or phenyl sulphonyl and carbonamide and $Y_1$ and $Y_2$ each is selected from the group of hydrogen, chlorine, bromine, lower alkyl and lower alkoxy, and wherein lower means containing at most 4 carbon atoms and acyl means benzoyl, lower alkanoyl, and a group of the formula

—OCONH—A or —OCO—B where A is phenyl, toluyl, chlorophenyl, methoxyphenyl, lower alkyl or cyclohexyl, and B is lower alkyl, cyclohexyl, chlorophenyl, styryl, benzyl, phenyl, bromophenyl, t-butylphenyl, cyanophenyl, lower alkoxy, phenoxy, and lower alkyl substituted by lower alkoxycarbonyl, phenyl, cyano, lower alkoxy, phenoxy, phenylsulfonyl, and lower alkylcarbonyl.

2. A water-insoluble styryl dyestuff as claimed in claim 1 of the formula

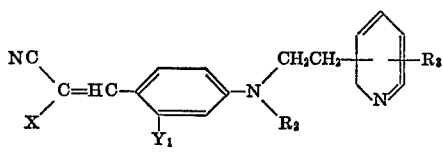

in which $R_2$ is selected from the group of lower alkyl, benzoyloxy lower-alkyl, phenylaminocarbonyloxy-lower-alkyl, lower alkanoyloxy-lower-alkyl and benzyl, and $R_3$ is selected from the group of hydrogen and lower alkyl.

3. The dyestuff as claimed in claim 1 of the formula

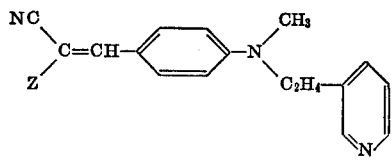

wherein Z is selected from cyano, carbethoxy, phenylsulfonyl and N-lower alkylcarbonamide where the lower alkyl moiety contains p to 4 carbon atoms.

4. The dyestuff as claimed in claim 1 of the formula

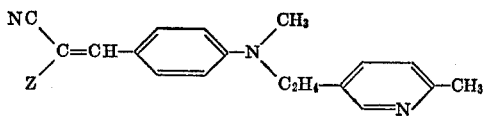

wherein Z is selected from cyano, carbethoxy, phenylsulfonyl and N-lower alkylcarbonamide where the lower alkyl moiety contains p to 4 carbon atoms.

5. The dyestuff as claimed in claim 1 of the formula

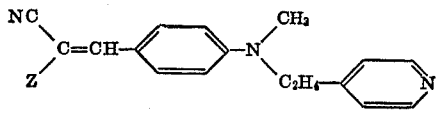

wherein Z is selected from cyano, carbethoxy, phenylsulfonyl and N-lower alkylcarbonamide where the lower alkyl moiety contains up to 4 carbon atoms.

6. The dyestuff as claimed in claim 1 of the formula

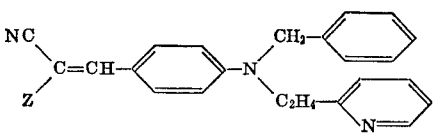

wherein Z is selected from cyano, carbethoxy, phenylsulfonyl and N-lower alkylcarbonamide where the lower alkyl moiety contains up to 4 carbon atoms.

7. The dyestuff as claimed in claim 1 of the formula

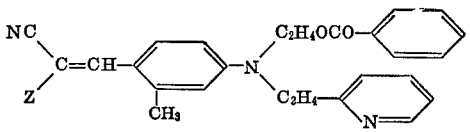

wherein Z is selected from cyano, carbethoxy, phenylsulfonyl and N-lower alkylcarbonamide where the lower alkyl moiety contains up to 4 carbon atoms.

8. The dyestuff as claimed in claim 1 of the formula

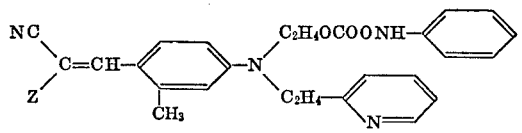

wherein Z is selected from cyano, carbethoxy, phenylsulfonyl and N-lower alkylcarbonamide where the lower alkyl moiety contains up to 4 carbon atoms.

References Cited

UNITED STATES PATENTS

| | | | |
|---|---|---|---|
| 3,583,551 | 1/1952 | Dickey et al. | 260—465 |
| 2,850,520 | 9/1958 | Merian et al. | 260—465 |
| 3,635,957 | 1/1972 | Genta | 260—240 R |

FOREIGN PATENTS

| | | | |
|---|---|---|---|
| 1,431,174 | 1/1966 | France | 260—294.9 |

ALAN L. ROTMAN, Primary Examiner

U.S. Cl. X.R.

260—240.9, 294.8 D, 294.8 F, 294.8 C, 294.9; 8—162 R

UNITED STATES PATENT AND TRADEMARK OFFICE
CERTIFICATE OF CORRECTION

PATENT NO. : 3,804,831
DATED : April 16, 1974
INVENTOR(S) : VISVANATHAN RAMANATHAN It is certified that error appears in the above-identified patent and that said Letters Patent are hereby corrected as shown below:

Column 1, line 6, insert --- Assignee: CIBA-GEIGY AG, Basel, Switzerland ---.

Signed and Sealed this

Twenty-ninth Day of March 1977

[SEAL]

Attest:

RUTH C. MASON
Attesting Officer

C. MARSHALL DANN
Commissioner of Patents and Trademarks